UNITED STATES PATENT OFFICE.

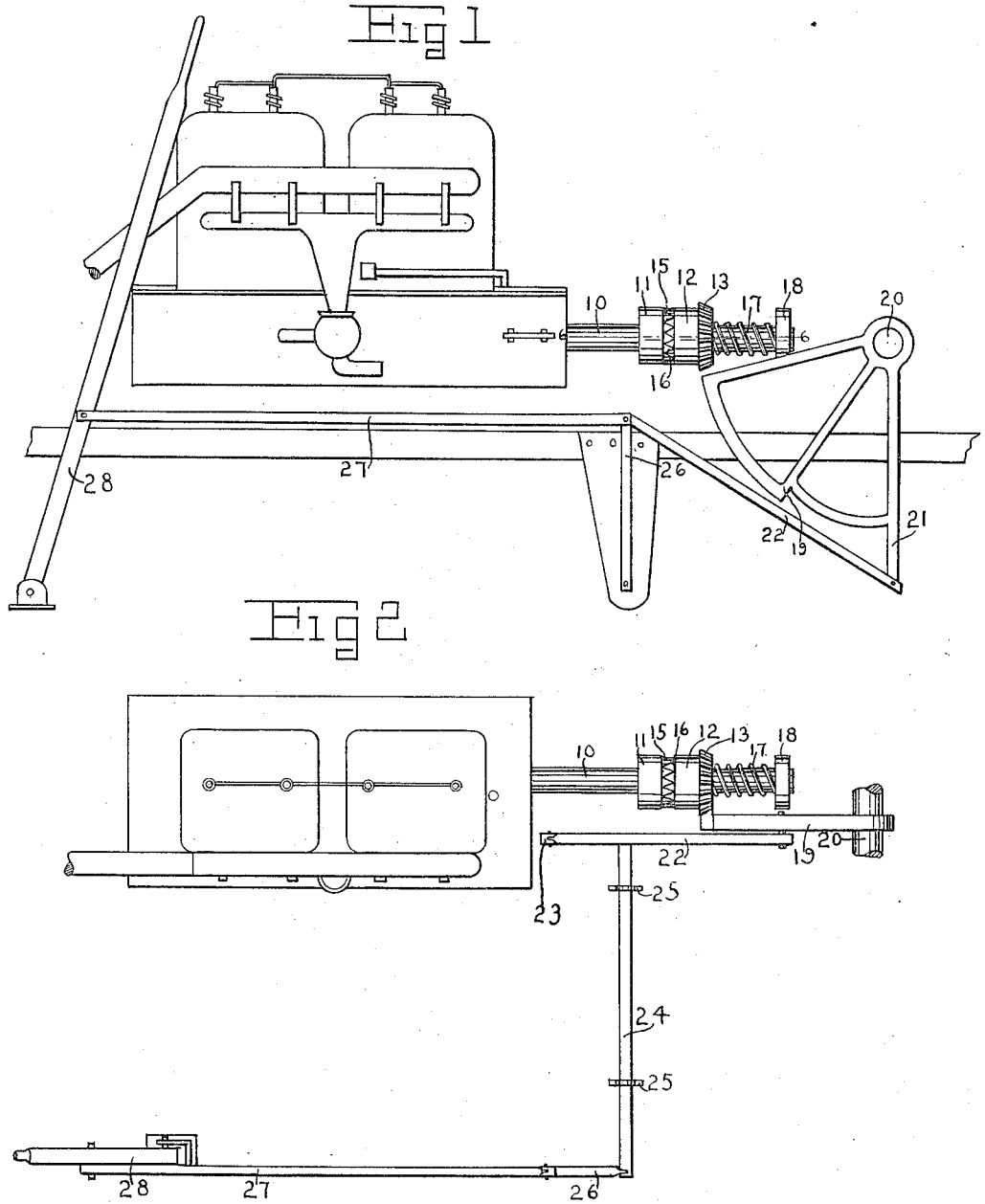

JOHN W. ULRICH, OF NEW ULM, MINNESOTA.

AUTOMOBILE ENGINE-STARTER.

1,145,529. Specification of Letters Patent. Patented July 6, 1915.

Application filed September 11, 1911. Serial No. 648,629.

*To all whom it may concern:*

Be it known that I, JOHN W. ULRICH, a citizen of the United States, residing at New Ulm, in the county of Brown, State of Minnesota, have invented certain new and useful Improvements in Automobile Engine-Starters; and I do hereby declare the following to be a full, clear, and exact description of the invention, such as will enable others skilled in the art to which it appertains to make and use the same.

This invention relates to a starting device for gasolene engines and more particularly, to an improved device adapted to be employed on automobiles whereby the engine may be safely and conveniently started from the operator's seat and thereby avoid injury to the operator often caused by back firing of the engine due to a premature explosion.

A further object of the invention is to provide the engine shaft with coacting clutch members and a novel arrangement of levers upon the body of the automobile for imparting an initial rotary motion to the shaft to form a compression in the engine cylinders from the seat, thereby avoiding the necessity of climbing from the automobile to start the engine.

With the above and other objects in view, the invention consists of certain other combinations and arrangements of parts as will be hereinafter more fully described and claimed, it being a still further object of the invention to provide a device which will not be likely to get out of working order.

In the drawings:—Figure 1 is a side elevation of an engine shaft of which a fragmentary portion is shown and provided with my improved starting device, in an inoperative position. Fig. 2 is a top plan view thereof in an operative position.

Referring to the drawings in detail, there is shown an engine shaft 10 of the usual construction and which at its forward end is provided with a clutch head 11 which is rigidly secured or keyed thereto while a coacting clutch head 12 is loose on the shaft 10 and provided with an integral gear wheel 13 outwardly thereof. The two clutch heads are provided with coacting beveled teeth adapted to move together when the shaft is rotated in an operative direction and adapted to move independently of each other through the medium of their beveled formation should the shaft be rotated in an opposite direction, the teeth 15 being formed upon the clutch head 11 while the teeth 16 extending in the opposite direction relative to the teeth 15 are formed upon the clutch head 12. In order to hold the clutch heads normally in engagement, a coiled spring 17 is mounted upon the shaft 10 outwardly of the clutch head 12 and gear wheel 13 and engages with an enlarged head 18 forming a flange at the extreme forward end of the shaft so as to bear against the clutch head and gear wheel but permit independent movement thereof relative to the spring which is thus mounted.

A segmental gear 19 is rotatably mounted upon a pivot 20 adjacent the floor of the automobile and is disposed normally out of mesh with the gear wheel 13 but adapted to coact therewith when reciprocated to impart rotary motion to the gear and similar movement to the shaft when the clutch heads are in engagement. For operating this segmental gear, I provide the gear with an arm 21 which is pivotally connected to a connecting rod 22 at its forward end while said connecting rod at its rear end is pivotally connected to an upwardly extending arm 23 rigidly connected to a transverse shaft 24 rotatably supported in bearings 25 mounted beneath the floor of the automobile. It will be seen that the arm 23 is carried at one end of the shaft while the opposite end of the shaft carries a similarly extended arm 26 which at its upper end is connected by a rod 27 for pivotal movement and adapted to be operated from an adjustable throw lever 28 to which said rod 27 is pivotally connected at its rear end and intermediate of the ends of the lever so that as the lever is moved rearwardly, the segmental gear will be rotated or swung upward to impart sufficient rotation to the shaft 10 for forming a compression of the gases within the engine cylinders of an engine to provide for an explosion thereof and consequent operation of the engine. When it is desired to start the engine, the lever will be rocked rearward to swing the segmental gear to a raised position and thus rotate the engine shaft. Should an explosion not take place however, the lever is moved forwardly and then pulled rearwardly again, this operation being repeated until the engine has been started, the fact that the gear 13 is loose on the shaft 10 permitting rotation of the engine shaft independent thereof for shifting the segmental gear to its original position, while the spring permits separation of the clutch heads should back firing take place to cause opposite rotation of the crank shaft and thereby prevent movement of the lever and operating parts from the gear 13 and injury to the starter.

From the foregoing description in connection with the accompanying drawings it will be readily seen that I have provided a simple and efficient starting mechanism for gasolene engines of the type set forth in which the operating mechanism provides for convenient starting of the engine by imparting initial rotary motion to the shaft thereof from the automobile seat by the chauffeur without the danger of injury from back firing.

I claim:—

The combination with an engine shaft, of a clutch head fixed to the shaft, a second clutch head loose upon the shaft and yieldably held in engagement with the first named clutch head to rotate therewith and with the shaft, a gear carried by said second named clutch head, a segmental gear normally disengaged from the clutch head gear, and means for operatively engaging said segmental gear with the clutch head gear, the clutch faces of said heads being constructed for disengagement upon independent rotation of the shaft in either direction, during engagement of said segmental and clutch head gears.

In testimony whereof, I affix my signature, in presence of two witnesses.

JOHN W. ULRICH.

Witnesses:
 HERM. MARTENS,
 CARL ULRICH.

Copies of this patent may be obtained for five cents each, by addressing the "Commissioner of Patents, Washington, D. C."